United States Patent
Chiodini et al.

(10) Patent No.: US 11,891,314 B2
(45) Date of Patent: Feb. 6, 2024

(54) APPARATUS AND METHOD FOR REMOVING HYDROCARBONS FROM A BODY OF WATER

(71) Applicant: ENI S.P.A., Rome (IT)

(72) Inventors: Andrea Chiodini, Mesero (IT); Stefano Loda, Cameriano (IT)

(73) Assignee: ENI S.P.A., Rome (IT)

( * ) Notice: Subject to any disclaimer, the term of this patent is extended or adjusted under 35 U.S.C. 154(b) by 810 days.

(21) Appl. No.: 16/462,104

(22) PCT Filed: Dec. 22, 2017

(86) PCT No.: PCT/IB2017/058329
§ 371 (c)(1),
(2) Date: May 17, 2019

(87) PCT Pub. No.: WO2018/116262
PCT Pub. Date: Jun. 28, 2018

(65) Prior Publication Data
US 2019/0330084 A1    Oct. 31, 2019

(30) Foreign Application Priority Data
Dec. 23, 2016    (IT) .................... 102016000130566

(51) Int. Cl.
*C02F 1/40*    (2023.01)
*B01D 17/00*    (2006.01)
(Continued)

(52) U.S. Cl.
CPC ............... *C02F 1/40* (2013.01); *B01D 17/10* (2013.01); *B01D 17/12* (2013.01); *C02F 1/001* (2013.01);
(Continued)

(58) Field of Classification Search
None
See application file for complete search history.

(56) References Cited

U.S. PATENT DOCUMENTS 4,273,650 A * 6/1981 Solomon ................. B09C 1/002
                                                        210/104
5,049,037 A    9/1991 Carson et al.
(Continued)

FOREIGN PATENT DOCUMENTS

| CN | 202954747 U | 5/2013 |
| CN | 203499666 U | 3/2014 |

(Continued)

OTHER PUBLICATIONS

Budgit Hoist, https://www.budgithoist.com/faq.html, published on Web, Nov. 15, 2016, as evidenced by WayBackMachine archived at https://web.archive.org/web/20161115141551/https://www.budgithoist.com/faq.html, obtained from Web, Mar. 26, 2022, 6 total pages. (Year: 2016).*

(Continued)

*Primary Examiner* — Jonathan M Peo
(74) *Attorney, Agent, or Firm* — Husch Blackwell LLP (57) ABSTRACT

The present invention relates to a device and an apparatus and relative method for removing hydrocarbons from a water body, in particular for the remediation of hydrophobic contaminated hydrocarbons present as a demixed phase. The device of the invention is equipped with at least one sensor which determines its position with respect to the demixed phase in the body of water, allowing automated modification of the position of the device with respect to the demixed phase in optimising its separation and recovery.

15 Claims, 9 Drawing Sheets

(51) Int. Cl.
*B01D 17/12* (2006.01)
*C02F 1/00* (2023.01)
*C02F 101/32* (2006.01)
*C02F 103/06* (2006.01)

(52) U.S. Cl.
CPC ...... *C02F 2101/32* (2013.01); *C02F 2103/06* (2013.01); *C02F 2201/002* (2013.01); *C02F 2201/009* (2013.01); *C02F 2209/008* (2013.01); *C02F 2209/42* (2013.01)

(56) References Cited

U.S. PATENT DOCUMENTS

| | | | |
|---|---|---|---|
| 5,099,920 A * | 3/1992 | Warburton | B09C 1/02 166/250.03 |
| 5,128,052 A | 7/1992 | Bullock | |
| 5,147,559 A | 9/1992 | Brophey et al. | |
| 5,509,479 A * | 4/1996 | Emmons | B09C 1/002 166/370 |
| 5,968,354 A | 10/1999 | Brinkley | |
| 6,615,925 B2 * | 9/2003 | Rice | E21B 27/00 417/36 |
| 2016/0367912 A1* | 12/2016 | Kennedy | B01D 17/0214 |

FOREIGN PATENT DOCUMENTS

| | | |
|---|---|---|
| DE | 3909372 A1 | 9/1990 |
| DE | 202011109950 U1 | 9/2012 |
| GB | 2373525 B | 11/2003 |
| WO | 2005089399 A2 | 9/2005 |

OTHER PUBLICATIONS

International Search Report and Written Opinion for PCT/IB/2017/058329 dated Mar. 5, 2018, 14 pages.

* cited by examiner

APPARATUS AND METHOD FOR REMOVING HYDROCARBONS FROM A BODY OF WATER

FIELD OF THE DISCLOSURE

The present invention relates to an apparatus and method for removing hydrocarbons from a body of water, in particular for the remediation of bodies of water contaminated by hydrocarbons present as a demixed phase.

BACKGROUND OF THE DISCLOSURE

The treatment of polluted water from organic compounds and the remediation of bodies of water contaminated by hydrocarbons is a topic of great relevance and to date is the subject of great attention for the development of more and more effective and suitable technologies for the purposes of purifying contaminated sites.

The widespread use, inappropriate disposal, spillages and accidental leakages of hydrocarbons, such as petroleum products and organic solvents, have caused the formation of persistent sources of soil and groundwater contamination which are hazardous to the environment and to human health. Depending on the organic material's density with respect to water, there may be floating water-immiscible liquid layers known as LNAPLs (Light Non Aqueous Phase Liquids), or sinking, known as DNAPLs (Dense Non Aqueous Phase Liquids) in the aquifer.

There are several methods known to date for the treatment of contaminated water.

The "pump-and-treat" method consists in the extraction of the polluted water by the use of immersible pumps. The pump suction is located at the interface between water and oil and collects a mixture of the two phases. The separation treatment of the two phases and their recovery/disposal is subsequently carried out on the surface. In this case, the collected water cannot be re-injected into the body of water and becomes waste to be disposed of or treated. There are also pumping systems coupled to active skimmers, equipped with a floating entrance which is positioned on the water-hydrocarbon interface in the body of water, limiting entry to the supernatant product only.

The "in situ flushing" method involves the following steps:
  injecting, into the contaminated area, an aqueous solution with "cleaning" action,
  pumping on the surface the water and elutriated water mixture (mixture of the flushed solution and contaminants), and
  treating the collected liquid for reuse or remediation.

Chemical compound solutions such as surfactants, solvents, acids, bases, oxidants, chelating agents can be used; their function is to improve the efficiency of the recovery by increasing the water solubility of the contaminant or its mobility (many organic pollutants have low solubility in water and tend to be adsorbed on the surface rocks) (S. Paria, Advances in Colloid and Interface Science, 138 (2008), pages 24-58), and by increased flushing speed.

The "dual pump" method uses two independent pumps, inserted into the recovery well. The first is positioned at the bottom of the well to extract water only; by this method it creates a depression cone which recalls the organic phase into the well. The second is positioned on the surface of the liquid at the level of the LNAPL and collects only the organic matter. A sensor system ensures that the two phases are collected separately. (C. J. Newell et al., US EPA Ground Water Issue Paper EPA/540/S-95/500, July 1995). In the dual well method, the pumps are placed in two different wells.

The "Soil Vapor Extraction (SVE)" method is a technique used for the extraction of volatile contaminants in the unsaturated area of the water (H. Kim et al., Environmental Science & Technology, 46 (2012) 9533-9540) and has as a result the removal of substances present in vapour phase or as demixed organic matter (NAPLs) or in aqueous solution. It enables a stream of air to be sent into the ground and to collect the vapour extracted through suitable wells built in the vadose area. The continuous flow of air produces a stripping of the vapours and the consequent evaporation of a new liquid phase and hence the gradual consumption of the contaminant in the soil. The gas, rich in pollutants, is finally sent to treatment units on the surface.

Organic treatment (bioremediation) (BK Yadav et al., Water Air Soil Pollut 220 (2011) pages 225-239) consists of the stimulation of the activity of the indigenous microorganisms present in the aquifer by adding nutrients (based on nitrogen and phosphorus), as well as an electron acceptor (generally oxygen). Microorganisms (bacteria, yeasts, fungi) use the contaminants as a source of nutrition and therefore bring about their removal. The reaction generally leads to complete mineralisation. In this process, mobilisation of NAPLs by surface-active working accelerates degradation.

Hydrophobic skimmers allow only the organic matter to be removed from the water body, leaving the water phase in the depths. The operation is based on the use of hydrophobic materials, which selectively absorb NAPLs (patent application GB2300823A, GB2357045A). The Abanaki 'PetroXtractor Well Oil Skimmer' (www.abanaki.com) was designed specifically for well applications where access to the surface of the fluid is limited. The heart of the system is a water-repellent selective belt, which passes through both phases and absorbs only the organic phase and, with continuous rotation, always exposes a 'clean' portion to the liquid, thus removing large volumes of organic material (up to 45 litres/hour). During the rotation the strap passes through a brush system which removes the organic portion from the surface and sends it to a collection system. In this mode the strap is continuously reusable. The belt is lowered into the shaft while the pulley is on the surface.

A groundwater remediation apparatus employing a hydrophobic and oleophilic membrane for the selective recovery of organic supernatant by permeation is described in the U.S. Pat. No. 5,795,474A.

"Filter canisters", i.e. portable appliances consisting of a filtering part in hydrophobic material and a permeate liquid collection tank, are also available on the market. They are lowered into the well with a rope and kept fixed in such a way that the filter is in contact with the liquid; only the organic fraction is collected and the water is kept on the water body. The canister can hold up to about 7.5 litres of liquid and is periodically emptied manually or with the use of a pump.

The various known systems described above do not fully meet the increasingly stringent requirements for remediation of contaminated sites, considering the need for rapid, effective and low cost interventions.

Many of the systems illustrated present a presence of water in the extracted liquid in amounts which require surface separation after treatment with high water disposal/treatment costs.

Pumping systems coupled to an active skimmer are influenced by the variation of the water-organic composition because they are based on the buoyancy principle of a body on a fluid and also do not completely remove the organic layer, leaving thicknesses of organic materials greater 5 mm in the water; consequently, the effectiveness of removing the organic material is compromised.

Filter canisters and skimmers, although simple to use and use, allow the recovery of reduced organic volumes intermittently and require the operator to intervene periodically to discharge manually.

The "in situ flushing" variant has better recovery efficiency, but involves the use of additional chemicals and complicates the treatment plant with the addition of injection wells. In addition, the availability of chemicals can be a problem in some specific sites.

Organic filtering or removal systems which have a fixed position within the well are not particularly effective in case of significant variations in the depth of the water. In the event of a rise in the water, the immersion of the filtering element will result in an abnormal water recovery, while in the case of lowering the water the apparatus may be so positioned that it cannot filter and remove the organic component.

In fact, all apparatus which relies on the floating of the recovery apparatus immersed in the contaminated body of water is ineffective.

A demixed organic phase filtration apparatus such as that exemplified in U.S. Pat. No. 5,795,474A, which uses its own water level to settle in the water, is difficult to manage during water remediation operations since, during the removal phase of the organic material, the fluid in which the apparatus is floating changes in its organic and water components by actually changing the floating arrangement of the apparatus. During remediation, the reduction in the organic layer increases the average density of the fluid in which the apparatus is immersed, resulting in a lowering of the floating line; consequently, the filtering area is at risk of not being correctly positioned.

SUMMARY OF THE INVENTION

It is an object of the present invention to provide an apparatus and a process which overcomes the drawbacks of the known art, allowing the removal of an organic phase demixed by a body of water efficiently, rapidly and with a smaller impact on costs.

The invention relates to a compact apparatus for removing an organic phase demixed by a body of water which is able to monitor water level fluctuations independently in order to optimise the collection of the supernatant organic phase. The ability of the apparatus to automatically adapt its position on the basis of the modifications which occur at the body of water level results in an optimum operation which maximises the flow of the demixed filtered organic phase, reducing the water content to the minimum.

The automatic positioning of the apparatus inside the body of water is made possible by specific sensors, making the apparatus independently reactive to the variation of the amount of demixed supernatant organic phase present in the body of water and of the level of the body of water.

DESCRIPTION OF THE DRAWINGS

The characteristics and advantages of the present invention will become apparent from the following description of a non-limiting example of it with reference to the figures in the accompanying drawings, in which.

Corresponding reference characters indicate corresponding parts throughout the drawings.

DETAILED DESCRIPTION

The object of the present invention is therefore an apparatus 10 for the removal of a demixed organic phase 40 which extends from a first lower interface surface WO with a heavier phase to a second upper interface surface GO with a lighter phase in a contaminated body of water comprising a mobile device 20, immersible in the contaminated body of water comprising a selectively permeable filter element 130 configuring a separation cavity 100, a collecting tank 201 configuring a collecting cavity 200 capable of containing the filtered hydrocarbons from the filtering element 130, these separation cavities 100 and collecting cavities 200 being fluidically connected to each other, suspension and handling means 140 of the mobile device 20 for the automatic control of its positioning with respect to the demixed organic phase 40 to be removed, the apparatus 10 being characterised by the fact of comprising at least one means for determining the relative position of the mobile device 20 with respect to the upper interface surface GO of the demixed organic phase 40 to be removed, a surface apparatus 30 comprising a remote control and handling unit 700 of the mobile device 20, a motor 600 controlled by the unit 700 and connected to the suspension and handling means 140, the means for determining the relative position being connected to the unit 700 and exchanging the detected information with it.

It is also the object of the present invention to provide a process for removing an organic phase demixed by a contaminated body of water as described below.

In the scope of the present invention, a phase separated by other phases (for example from the aqueous or possibly from a gaseous phase) is defined as a "demixed" phase, present in a body of water.

In the scope of the present invention, the term "upper" is meant as an indication of a position within the body of water closest to the atmosphere, while the term "lower" is intended as an indication of a position within of the body of water closest to the bottom B.

The present invention applies in a context in which a contaminated body of water contains at least one demixed organic phase 40, delimited by a lower phase interface WO with a heavier liquid 50 (e.g., water) and a upper phase interface GO with a lighter liquid or a gas 60. The bottom B delimits in a lower way the development of the body of water.

Figure 1:
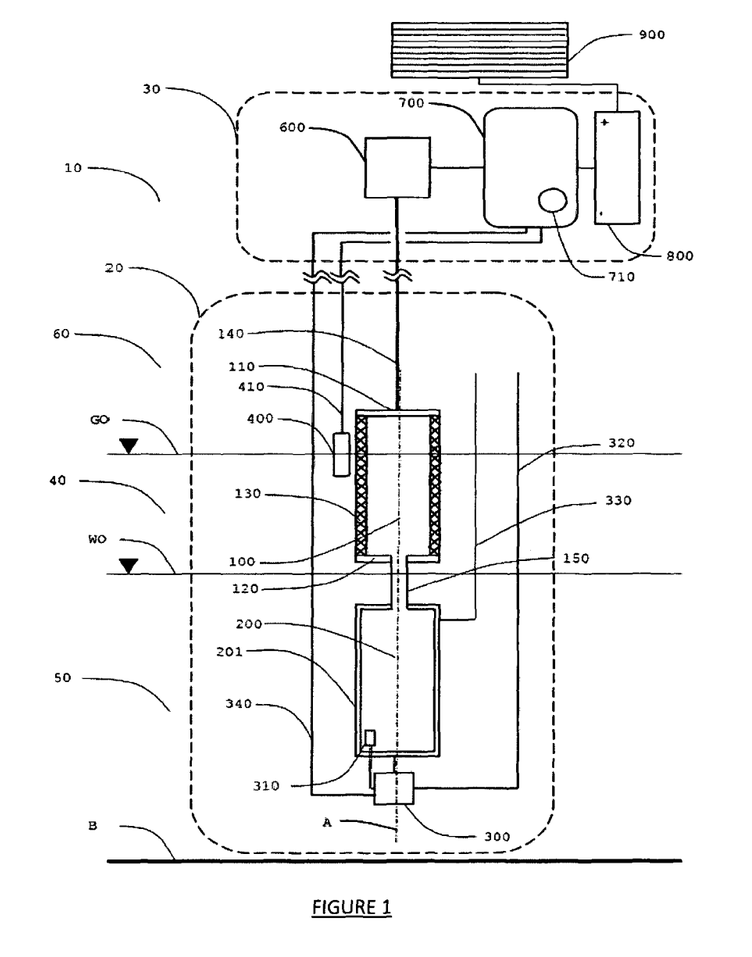
FIG. 1 is a simplified diagrammatic view of an apparatus according to the present disclosure comprising a mobile device and a surface apparatus with at least one level sensor and the principal elements required for operation and with parts omitted for clarity.

With reference to FIG. 1, the subject of the present invention is an apparatus 10 for removing a demixed organic phase 40 comprising a mobile device 20, which is immersed in the contaminated body of water and a surface apparatus 30 which controls and handles the mobile device 20. The mobile device 20 comprises a selectively permeable filtering element 130 configuring a separation cavity 100. When the apparatus is immersed in the body of water, the selectively permeable filter element 130 separates the demixed organic phase 40 into the separation cavity 100. The mobile device 20 further also comprises a collecting cavity 200 in fluid communication with the separation chamber 100 which stores the previously separated demixed organic phase 40 in the separation chamber 100. The connection between the separation chamber 100 and the collection chamber 200 is made in such a way as to allow the emptying of the separation chamber 100 and respective filling of the collection chamber 200, preferably by gravity.

The mobile device 20 has no means of floating which allows it to retain its position once immersed in the contaminated body of water.

The mobile device 20 comprises at least one means for determining the relative position of the apparatus 20 with respect to the demixed gas/phase interface GO. The apparatus 20 is provided with suspending and handling means 140 for automatic control of its positioning with respect to the demixed gas/phase interface GO.

The surface apparatus 30 comprises a remote control and handling unit 700 of the mobile device 20 and a motor 600 which, by means of the suspension and handling means 140, modifies the position of the mobile device 20 based on the commands received from the control 700. The suspension and handling means 140 can be selected from ropes, cables, belts, strands, chains whose materials may be selected from metals or their alloys, plastics, organic fibres or inorganic fibres. At least one means of determining the relative position of the apparatus 20 with respect to the demixed gas/phase interface GO is connected to the control and handling unit 700 and exchanges the detected information with this. The control 700, based on the received data and predefined reference values, implements independently the logics needed to automatically change the position of the mobile device 20 by selectively assigning the commands to the 600 motor.

In a preferred configuration of the invention, the means for determining the relative position of the mobile device 20 with respect to the demixed gas/phase interface GO is a level sensor 400 installed in a predetermined position with respect to the mobile device 20 and configured to measure its distance from the surface of the upper GO interface of at least one demixed organic phase 40 to be removed. Since the position of the level sensor 400 is known with respect to the mobile device 20, based on the detection of the distance of the level sensor 400 from the upper interface surface GO, it is possible to determine the position of the selectively permeable filter element 130 with respect to the demixed organic phase 40 to be removed.

Figure 2:
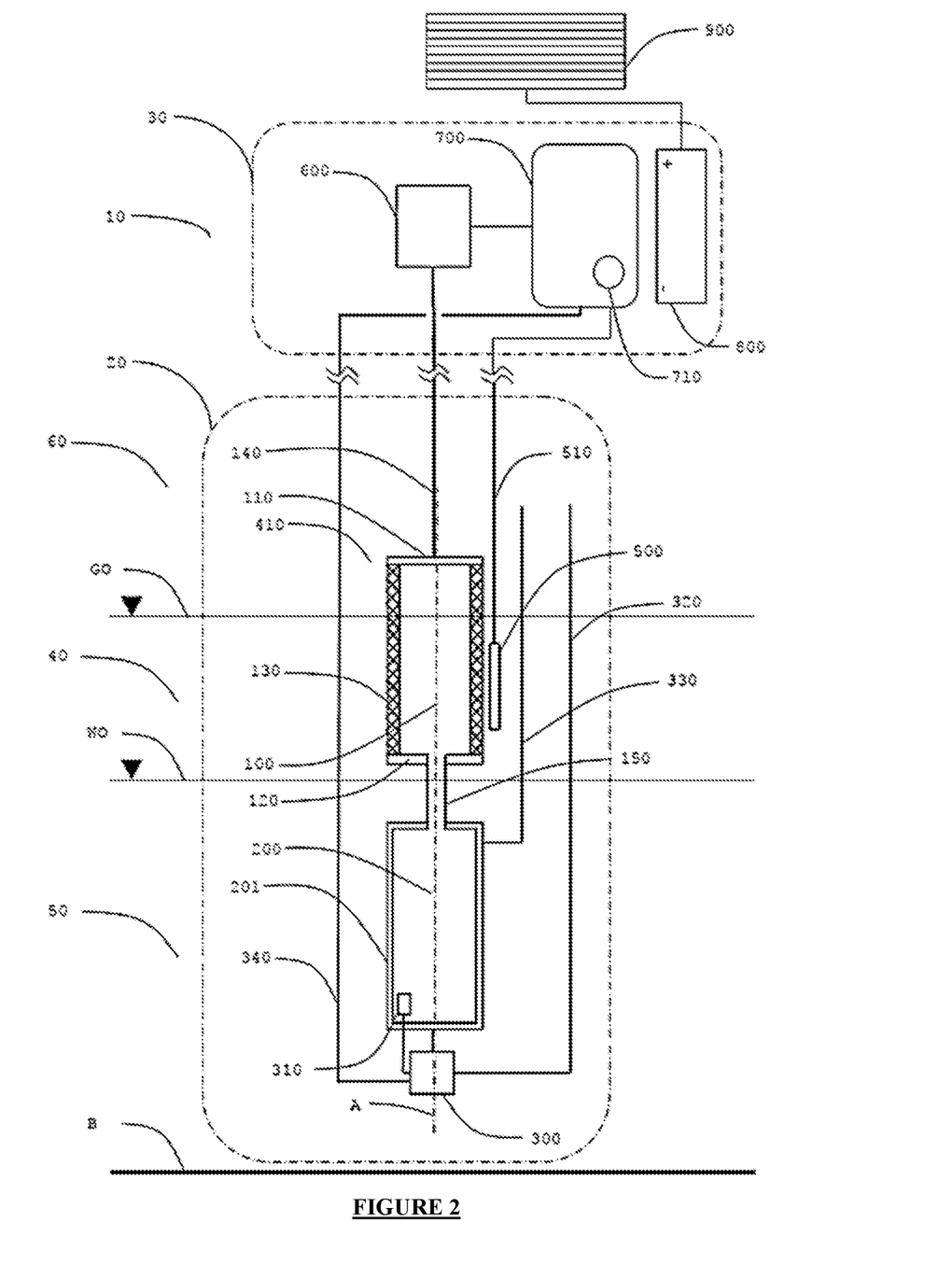
FIG. 2 is a simplified diagrammatic view of the apparatus of FIG. 1 comprising the mobile device and the surface apparatus with at least one phase sensor and the principal elements required for operation and with parts omitted for clarity.

With reference to FIG. 2, in a further preferred configuration of the invention, the means for determining the relative position of the mobile device 20 with respect to the upper demixed gas/phase interface GO is a phase sensor 500, installed in a predetermined position relative to the mobile device 20, configured to detect the presence of demixed organic phase 40 in the fluid in which it is immersed. The signal of detection by the phase sensor 500 of demixed organic phase 40 is sent to the control and handling unit 700. In case of detection by the 500 sensor phase of the water phase, the remote control and handling unit 700 commands the motor 600 independently to modify the positioning of the mobile apparatus 20 by lifting it out of the liquid phase.

It will be apparent from the description that the combination of information from the level sensor 400 and the phase sensor 500 is particularly advantageous to make the independent handling behaviour of the mobile device 20 more precise and effective.

Figure 2A:
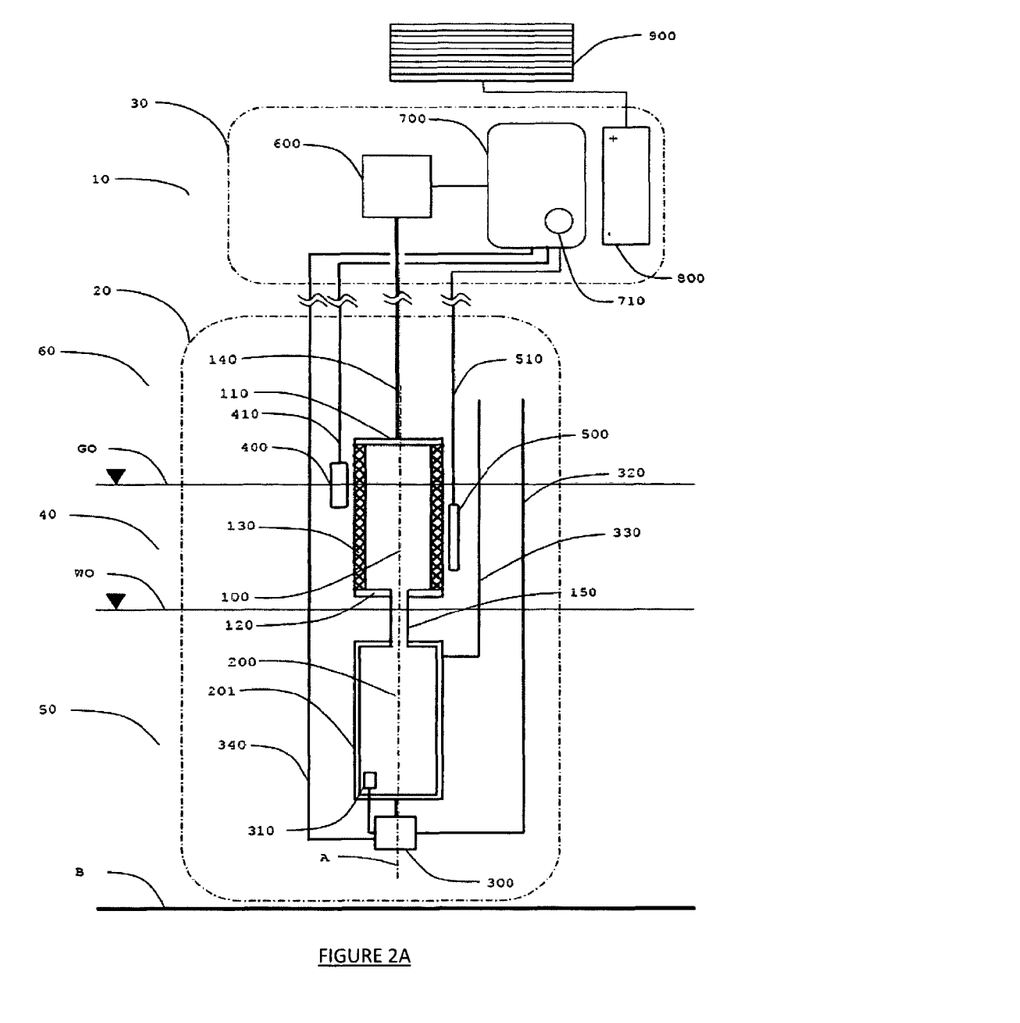
FIG. 2A is a simplified diagrammatic view of the apparatus of FIG. 1 comprising the mobile device and the surface apparatus with at least one level sensor, at least one phase sensor and the principal elements required for operation and with parts omitted for clarity.

In a preferred configuration of the invention as in FIG. 2A, therefore, apparatus 10 comprises, as a means for determining the relative position of the mobile apparatus 20 with respect to the demixed gas/phase interface GO, at least one level sensor 400, installed in a predetermined position of the mobile device 20, configured to measure its distance from the upper surface interface GO of at least one demixed organic phase 40 to be removed and at least one phase sensor 500 installed in a predetermined position with respect to the mobile device 20, configured to detect the phase of the fluid in which it is immersed and to determine the thickness of the demixed organic phase 40.

Figure 2B:
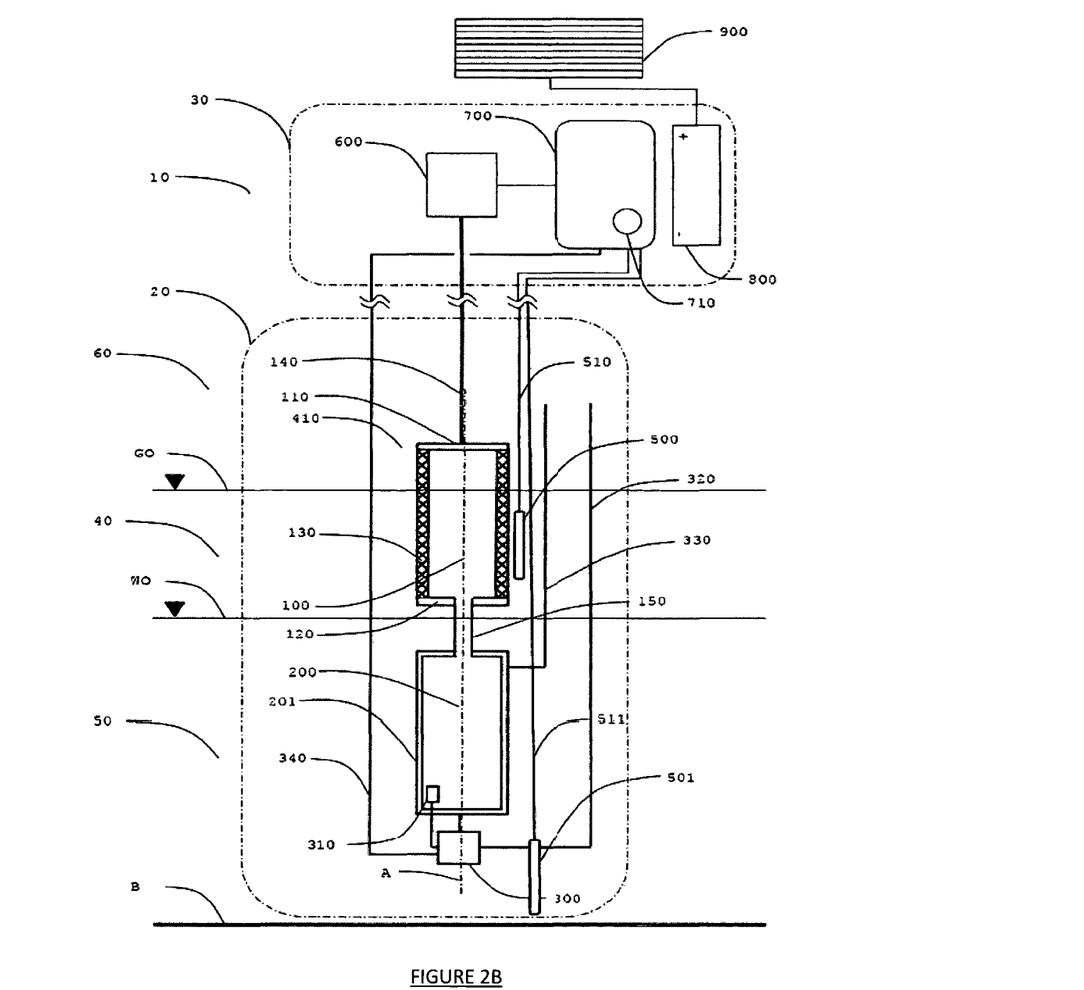
FIG. 2B is a simplified diagrammatic view of the apparatus of FIG. 1 comprising the mobile device and the surface apparatus with at least two phase sensors and the principal elements required for operation and with parts omitted for clarity.

In a preferred configuration of the invention as in FIG. 2B, apparatus 10 comprises at least a first phase sensor 500 and a second phase sensor 501 as means for determining the relative position of the mobile device 20 with respect to the surface of the upper interface GO; the first phase 500 sensor is installed in a predetermined position with respect to the mobile device 20 and configured to obtain its distance from the upper interface surface GO of at least one demixed organic phase 40 to be removed and the second phase sensor 501 is installed below the first phase sensor 500 in a predetermined position with respect to the mobile device 20 and configured to detect the presence of demixed organic phase 40.

Figure 2C:
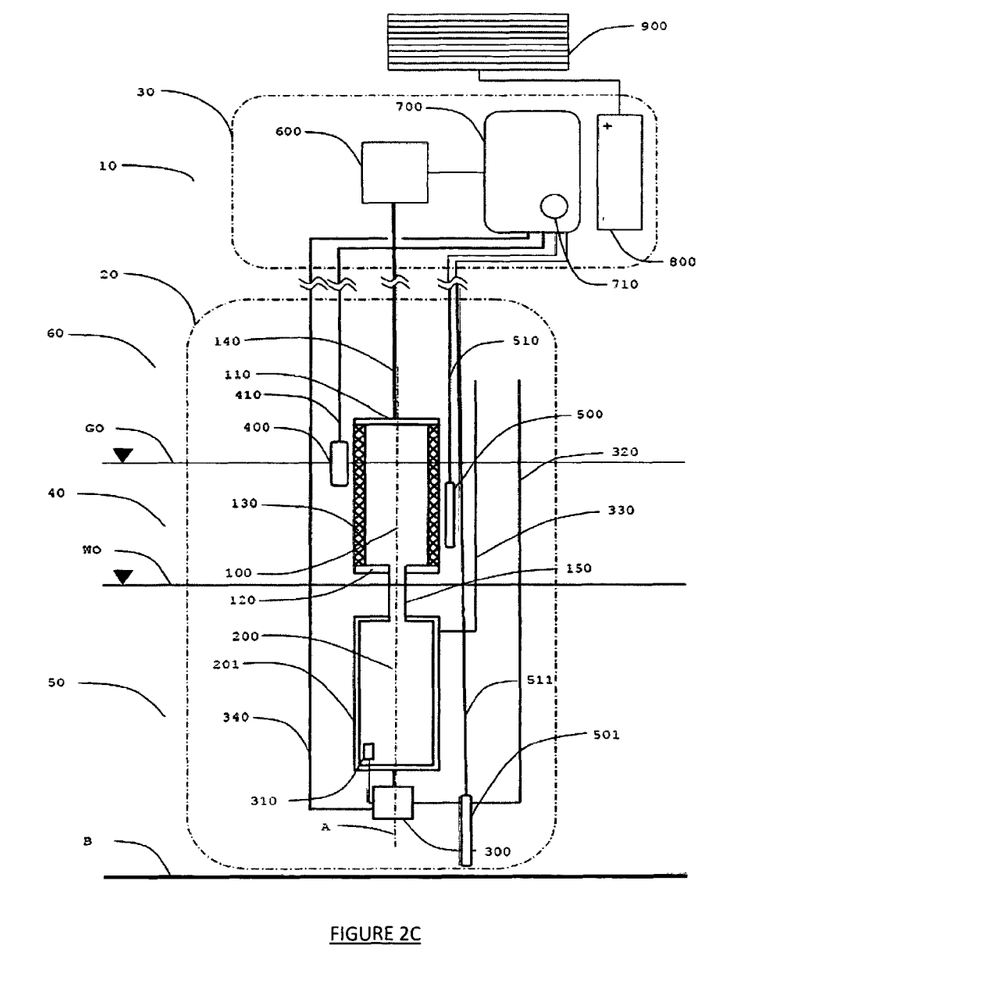
FIG. 2C is a simplified diagrammatic view of the apparatus of FIG. 1 comprising the mobile device and the surface apparatus with at least two phase sensors, at least one level sensor and the principal elements required for operation and with parts omitted for clarity.

In a further preferred configuration of the invention as in FIG. 2C, the apparatus 10 comprises, as a means for determining the relative position of the mobile device 20 with respect to the demixed gas/phase interface GO, at least one level sensor 400, installed in a predetermined position of the mobile device 20, configured to measure its distance from the surface of the upper interface GO of at least one demixed organic phase 40 to be removed, at least one first phase sensor 500 and at least one second phase sensor 501; the first phase sensor 500 is installed in a predetermined position with respect to the mobile device 20 and configured to detect the presence of a minimum demixed organic phase 40 to be removed and the second phase sensor 501 is installed below the first phase sensor 500 in a predetermined position with respect to the mobile device 20 and configured to detect the presence of demixed organic phase 40.

The selectively permeable hydrophobic filter elements are known per se; they are also known selectively permeable oleophilic filtering elements.

In a preferred configuration of the invention, the selectively permeable filter element 130 of the apparatus 10 is a hydrophobic filter. In this configuration, the capacity for removal of the demixed organic phase 40 is greatly improved by reducing the water trapped downstream of the separation. The hydrophobic filter is susceptible to prolonged contact with an aqueous phase which results in its premature deterioration and drop in selective filtration capacity; it is therefore important that the mobile device 20 in which the hydrophobic filter is installed is always positioned optimally with respect to the demixed organic phase 40 and in respect to the lower phase interface WO.

The invention described above allows for a proper control of the positioning of the mobile device 20 automatically and continuously without the intervention of the operator based on the information detected by the sensors installed on the mobile device 20.

The demixed organic phase 40, once captured in the separation cavity 100 by means of the selectively permeable filter element 130, is conveyed into the collecting cavity 200 where it accumulates. In order to avoid the blockage of the mobile device 20 when the collection cavity 200 is full, the collecting tank 210 must be emptied periodically; with a view to the object of the invention having an apparatus 10 in automatic operation, the emptying of the collection tank 210 is effected by means of a pump 300 controlled by a level sensor 310 installed inside the collection tank 210.

In a preferred configuration of the invention, the apparatus 10 comprises a pump 300, fluidly connected to the collecting cavity 200, configured to empty the collecting tank 210 by means of an evacuation duct 320 on the command of a level sensor 310 installed inside the collection tank 210.

The apparatus 10, for its proper operation, needs to be electrically powered for the functions of the control and handling unit 700, for the actuation of the motor 600, for the functions of the sensors 310, 400, 500 and for any further additional components.

The necessary power supply can be made by connecting to an electrical network or by using batteries. The solution of supply via batteries, preferably rechargeable, allows the apparatus 10 to be even more versatile and independent of the context in which it is used without the need for an external power supply.

In a preferred configuration of the invention, therefore, the surface apparatus 30 of the apparatus 10 comprises at least one rechargeable battery 800 for supplying the apparatus 10 without the use of additional external power sources.

In a further preferred configuration of the invention, in order to increase the independence of operation and improve availability, the apparatus 10 comprises at least one solar panel 900 configured to recharge at least one rechargeable 800 battery.

As previously advanced, in some operational situations related to the contaminated levels of the body of water or to the thickness of the demixed organic phase 40, it is desirable to be able to automatically lift the mobile device 20 from the body of water for a programmed time period. To this end, it is necessary to provide a programmable timer which, connected to the control and handling unit 700, cooperates in the selective timing of the mobile device 20 from the body of water.

In a preferred configuration of the invention, the remote control and handling unit 700 of the apparatus 10 comprises at least one programmable timer 710.

The adoption of a configuration of apparatus 10 comprising at least two phase sensors 500, 501 appropriately positioned as described above, allows the implementation of a control over the amount of demixed organic phase 40 present and over the method of engagement and disengagement of the mobile device 20 with respect to the body of water. In particular, the first sensor 501 detects the presence of demixed organic phase 40 in the fluid in which it is immersed by sending the signal of detection of demixed organic phase 40 to the control and handling control 700.

In case of detection by the phase sensor 500 of the water phase, the remote control and handling unit 700 independently controls the motor 600 to modify the positioning of the mobile apparatus 20 by lifting it out of the liquid phase. When the mobile device 20 is lifted out of the liquid phase to a distance preferably between 10 and 30 cm from the upper phase interface GO with respect to the lower part of the mobile device 20, the second phase sensor 501, located below the first phase 500 sensor, remains in contact with the liquid phase; the said sensor 501 sends a signal to the control and handling control unit 700 in the case of the detection of a demixed organic phase 40 so that the positioning of the mobile device 20 is automatically modified by returning the mobile device 20 to immersion in the liquid phase to continue with the filtering operations. In this way, the second phase sensor 501 acts as a control sensor which guarantees the re-immersion of the mobile device 20 in the liquid phase only when there is once again present an appropriate amount of demixed organic phase 40 to be removed.

As described above, the level sensor 400, the phase sensors 500 and 501 are connected to the control and handling unit 700 respectively by the wiring 410, 510, and 511. The information detected by the sensors 400, 500 and 501 is thereby conveyed to the control 700 for processing. The use of wireless technology for the connection of the sensors 400, 500, 501 to control panel 700 represents a preferred and advantageous implementation for apparatus 10, enabling the construction of a simplified mobile device 20 and easier handling in operation.

The bodies of water contaminated by demixed organic phases can be of various types; the use of apparatus 10 in the remediation of contaminated water is frequent. Normally aquifers are equipped with piezometric wells whose diameter ranges from 50 mm to 150 mm. The use of the apparatus 10 of the present invention in piezometric wells is particularly advantageous as it allows the remediation of polluted water by using existing infrastructures speeding up and simplifying operations.

In a preferred configuration of the invention, mobile device 20 has a maximum cross-sectional dimension, measured orthogonally to a longitudinal axis A, equal to or less than 100 mm, preferably between 45 mm and 95 mm.

Another object of the present invention is an automatic process for removing a demixed organic phase 40 from a contaminated body of water; the automatic process object of the invention utilises the apparatus 10 which may be provided with one or more sensors to determine the position of the mobile apparatus 20 with respect to the demixed gas/phase interface GO. Based on the information received from one or more sensors installed in the mobile device 20, the control and handling unit 700 determines which action is most appropriate between the partial lifting or lowering, the complete disengagement or the standing of the apparatus 20 immersed in the contaminated fluid. The apparatus may operate on the basis of the measurements of at least one level sensor 400 or at least one phase sensor 500 or at least two phase sensors 500, 501 or combining the information from at least two level sensors 400 and phase sensors 500 or combining the information from at least three level sensors 400, phase sensors 500 and 501. In preferred configurations the apparatus may be provided with additional sensors, preferably configured to determine the position of the apparatus 20 in the contaminated body of water.

It is therefore an object of the present invention to provide for an automatic process for removing a demixed organic phase 40 extending from a lower interface surface WO with a heavier phase at an upper surface GO with a lighter phase in the contaminated body of water comprising the phases of:
   a) providing an apparatus 10 as described above;
   d) lowering the mobile device 20 into the contaminated body of water;
   e) determining the position of the mobile device 20 with respect to the upper interface GO of the demixed organic phase 40 on the basis of the information from one or more sensors 400, 500, 501 of the mobile device 20;
   f) selectively filtering the demixed organic phase 40;
   g) automatically modifying the position of the mobile device 20 based on the information from one or more sensors 400, 500, 501 of the mobile device 20 acting on the motor 600 controlled by the remote control and handling unit 700;
   h) removing the mobile device 20 from the contaminated body of water.

The above-described process allows the position of the selectively permeable filter element 130 to be automatically adjusted in such a way as to maintain it in an effective operating range. The apparatus 10 is thus completely independent and operates with a reduced need for maintenance and surveillance by the operator.

Figure 6:
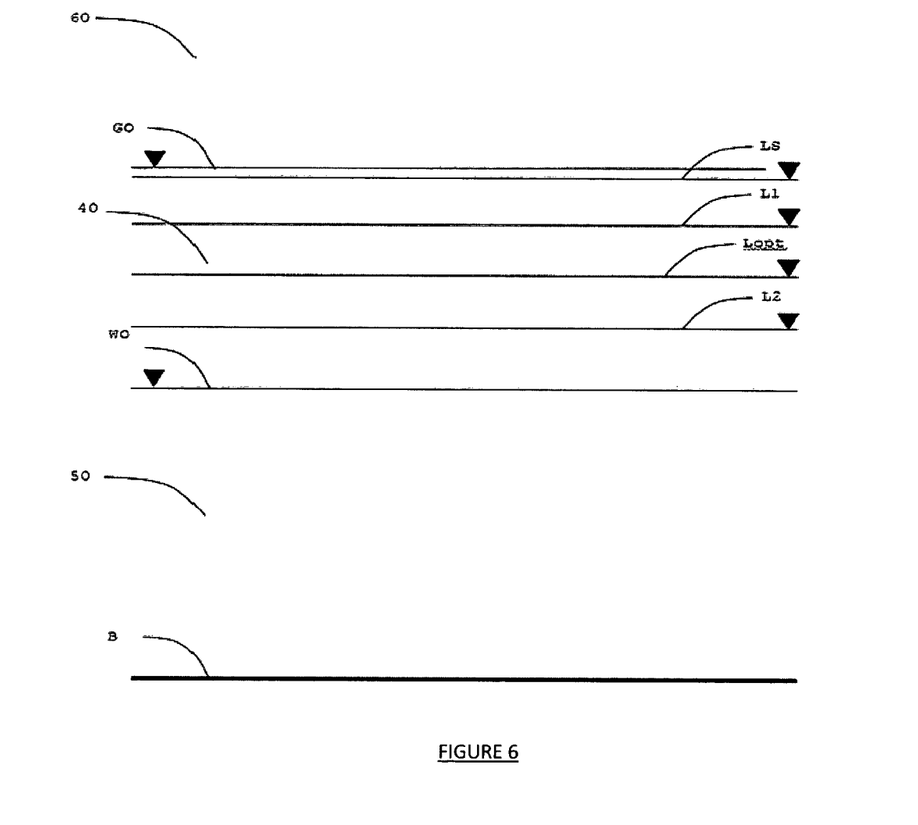
FIG. 6 shows diagrammatically the LS, L1, Lopt and L2 predetermined level values with parts omitted for clarity.

The positioning of the selectively permeable filtering element 130 can be made more effective by defining a predetermined optimum operating value Lopt and by an interval around the Lopt value determined by a lower value L2 and a upper value L1, in which Lopt is included; a threshold value LS is also defined used to optimise the positioning process of the mobile device 20 with respect to the demixed gas/phase interface GO. The LS, Lopt, L1, and L2 values are values measured from the upper interface surface GO of the demixed organic phase 40 to be removed.

Preferably the value of LS varies between 20 mm and 100 mm, the value of L1 varies between 340 mm and 440 mm and the value of L2 varies between 350 mm and 450 mm.

The control and handling unit 700 is then programmed by entering the predefined values of LS, L1 and L2 and Lopt.

Figure 4:
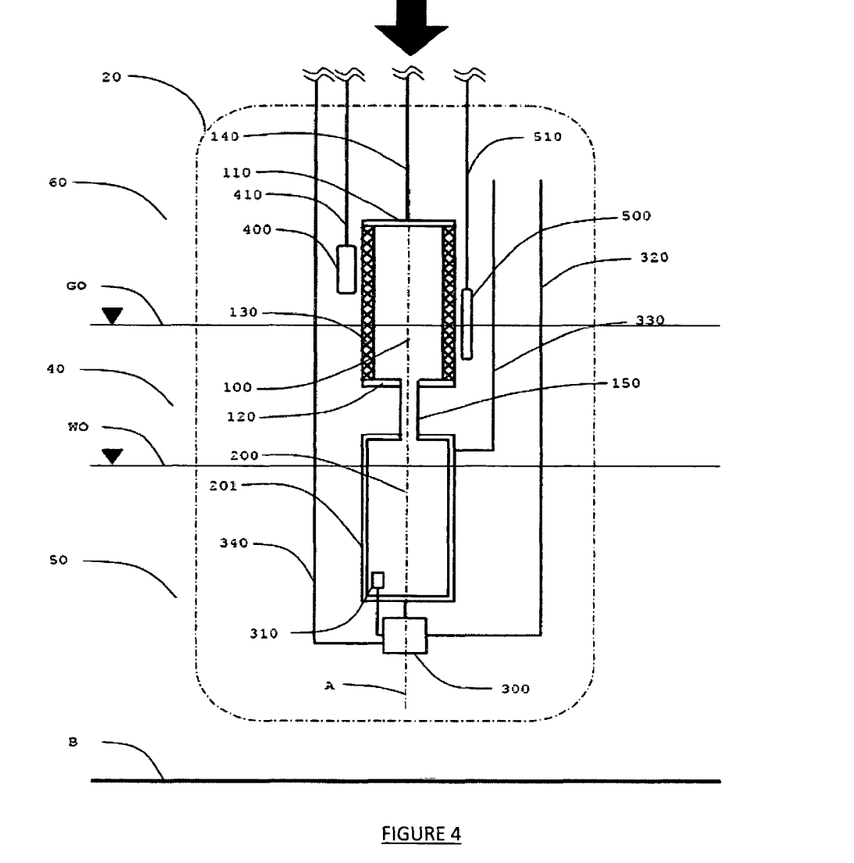
FIG. 4 illustrates diagrammatically the mobile device in a first operating conditions.
Figure 5:
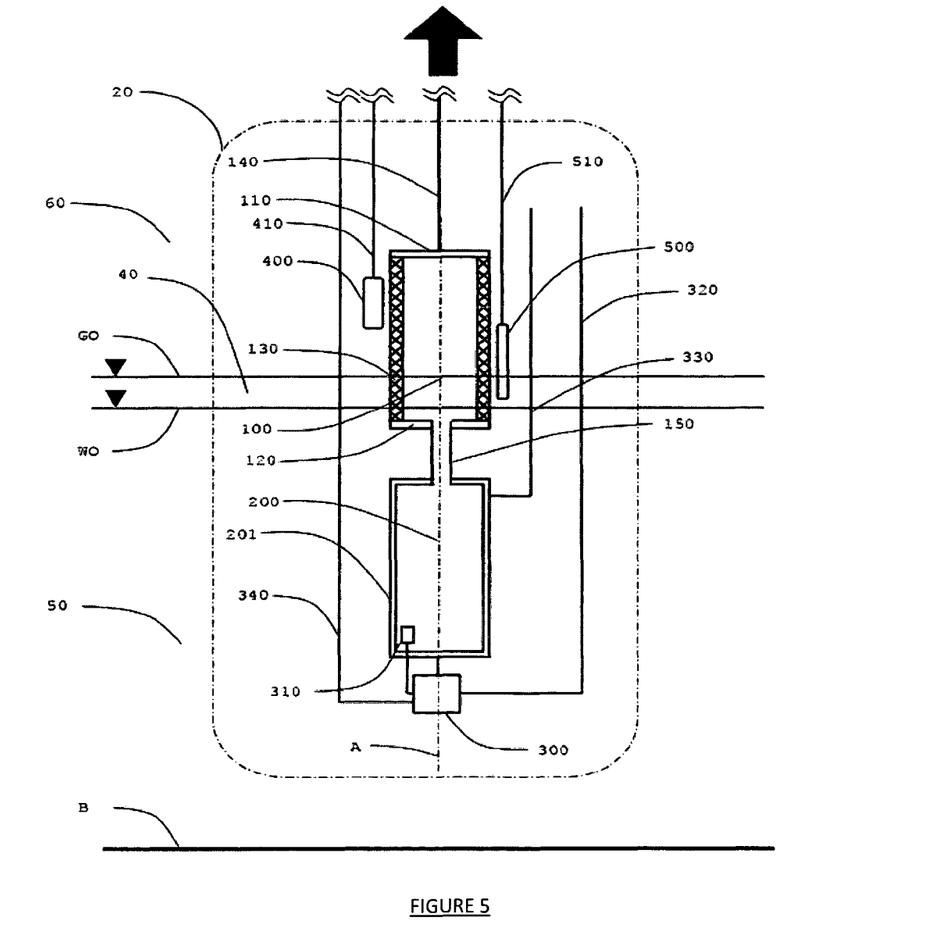
FIG. 5 illustrates diagrammatically the mobile device in a second operating condition, indicating how the automatic positioning unit acts to optimise the recovery performance of the demixed phase.

During the selective filtration phase of the demixed organic phase 40, when at least one level sensor 400 is present, the automatic modification of the position of the mobile device 20 is performed on the basis of reading the values measured by the level sensor 400 with respect to the surface of the upper interface GO. When the value measured by the sensor 400 is lower than the upper value L1, the mobile device 20 is lowered to the depth of the water body, while when the value measured by the sensor 400 is greater than the lower value L2, the mobile device 20 is lifted in the body of water in order to keep the mobile device 20 at normal operating value Lopt.

In a preferred configuration of the invention, the automatic process for removing a demixed organic phase 40 which extends from a lower interface surface WO with a heavier phase to an upper interface surface GO with a lighter phase in the body of contaminated water further comprises the phases of:
   b) defining a threshold value LS, a lower value L2, an upper reference value L1 and a normal operation value Lopt, between the lower value L2 and the upper value L1, of the distance of the level sensor 400 from the surface of the upper interface GO of the demixed organic phase 40 to be removed;
   c) programming the control and handling unit 700 by inserting the predefined threshold LS, lower L2, upper L1 and normal operation Lopt values of the distance of the level sensor 400 from the upper surface GO of the demixed organic phase 40 to be removed;
in which phase g) described above is carried out when the distance of the level sensor 400 from the upper interface GO of the demixed organic phase 40 to be removed is less than the upper value L1 or greater than the lower value L2, maintaining the position of the mobile device 20 at the normal operating value Lopt.

In order to make the operations of the apparatus 10 rapid and more efficient, it has been found advantageous to be able to move the mobile device 20 at a vertical velocity which may vary; in particular, a rapid vertical handling velocity Vr, whose value is between 50 mm/s and 300 mm/s, is defined and a slow vertical handling speed Vl whose value is between 5 mm/s and 15 mm/s. In a preferred configuration of the invention, it is possible to determine for which phases the mobile device 20 is moved with the velocity Vr or Vl.

In a preferred configuration of the invention, phase d) of the above-described process is carried out at a rapid vertical handling velocity Vr of the mobile device 20, comprised between 50 mm/s and 300 mm/s, until the level sensor 400 measures a distance from the upper interface surface GO equal to or greater than the threshold value LS.

In a further preferred configuration of the invention, phase h) is carried out at a rapid vertical handling velocity Vr of the mobile device 20, between 50 mm/s and 300 mm/s, when the level sensor 400 measures a distance from the upper interface surface GO equal to or less than the LS threshold value.

In a further preferred configuration of the invention, phase g) is carried out with a slow vertical handling speed Vl of the mobile device 20 between 5 mm/s and 15 mm/s.

The automatic process for removing a demixed organic phase 40 may be performed by using at least one phase detector 500 to determine the position of the mobile device 20 with respect to the upper interface surface GO. In the configuration of the apparatus 10 comprising at least one phase sensor 500, readings from the sensor 500 are used to establish whether the mobile device 20 is immersed in a gaseous zone or in an ambient air, in an organic phase zone or in a predominantly aqueous zone. The mobile device 20 is then moved on the basis of the information received from the phase sensor 500, identifying the descent speed based on the position of the device 20 itself. Since the control of the position of the mobile device 20 via the sensor 500 is based solely on the detection of the phase in which the device is immersed, it is necessary to define a time period of standing of the device T1 to define the time period in which the device 20 stays immersed in the demixed organic phase 40.

In a preferred configuration of the invention, the automatic process for removing a demixed organic phase 40 extending from a lower WO interface surface with a heavier phase to an upper surface interface GO with a lighter phase in the body of contaminated water further comprises the steps of:

defining a time interval T1 of the mobile device 20 and consequently programming the timer 710;

lowering the mobile device 20 with a rapid vertical handling velocity Vr up to detecting the demixed organic phase 40 by means of the phase sensor 500;

lifting the mobile device 20 with a slow vertical handling velocity Vl up to its complete disengagement from the liquid phase based on the information from the phase sensor 500;

lowering the mobile device 20 with a slow vertical handling speed Vl up to detecting a demixed organic phase 40 by means of the phase sensor 500;

activating the programmable timer 710 and counting the T1 timing interval of the standing of the mobile device 20 in the demixed organic phase 40;

repeating for a number of times the phases from k) to m) previously described at the end of the T1 standing time interval.

When the equipment 10 operates by means of the phase sensor 500, at the moment when the demixed organic phase 40 is not detected, the mobile device 20 is lifted to its complete disengagement from the liquid phase and kept stationary in the air or gas phase for a pre-determined pause time Tp. At the end of the pause time Tp, the mobile device 20 is again lowered according to the modes already described.

In the preferred configuration of equipment 10 in which at least one first phase sensor 500 and a second phase sensor 501 are installed, the position control of the mobile device 20 when disengaged from the liquid phase is dependent on the signal from the second phase sensor 501, being installed below the first phase sensor 500, it remains immersed in the liquid phase even when the mobile device 20 is completely disengaged from the liquid phase. The remote control and handling control unit 700, based on the indication of demixed organic phase 40 performed by the second phase sensor 501, controls the motor 600 independently to modify the positioning of the mobile device 20 by immersing it in the liquid phase to continue the operation of the filtration and removal of the demixed organic phase 40.

In a preferred configuration of the invention, the automatic process for removing a demixed organic phase 40 extending from a lower WO interface surface with a heavier phase to an upper interface surface GO with a lighter phase in the body of contaminated water further comprises the phases of:

lifting the mobile device 20 with a slow vertical handling velocity Vl until its complete disengagement from the liquid phase based on the information from the phase sensor 500, when the phase sensor 500 does not detect the demixed organic phase 40;

keeping the mobile device 20 stationary in a complete disengaged position from the liquid phase for a predetermined pause time Tp;

repeating the previously described phases j) to p) for a number of times

In a further preferred configuration of the invention, the automatic removal process of a demixed organic phase 40 extending from a lower WO interface surface with a heavier phase to an upper surface interface GO with a lighter phase in the body of contaminated water comprises, alternatively, phase p) described above, phase pp) of keeping the device 20 stationary, in a position of complete disengagement from the liquid phase, when the second phase sensor 501 detects the presence of demixed organic phase 40. At the moment when the phase sensor 501 again detects the demixed organic phase 40, the remote control and handling unit 700 is given a modification consensus indication for the position of the mobile device 20 to return it to immersion in the liquid phase.

The process described allows effective management of the selectively permeable filter element 130 by drastically reducing exposure for extended periods of time, thereby avoiding potential deterioration of its surface structure; furthermore, as previously described, the filtering element 130 is operative only when it is necessary, or when there is a demixed organic phase 40 with thicknesses greater than or equal to 1 mm.

An additional advantage of the present invention is that the mobile device 20 is not provided with continuous moving parts; this feature reduces energy consumption and enhances the operating independence of the equipment 10 when energised by rechargeable batteries.

As previously described, the combination of the measurements made by the level sensor 400 and the phase sensor 500 is particularly effective in determining the handling logic of the mobile device 20 with respect to the upper interface surface GO.

The combination of measurements made by the level sensor 400, the phase sensor 500, and the phase sensor 501 further helps to optimise the automatic positioning of the mobile device 20 with respect to the upper interface surface GO.

Figure 3:
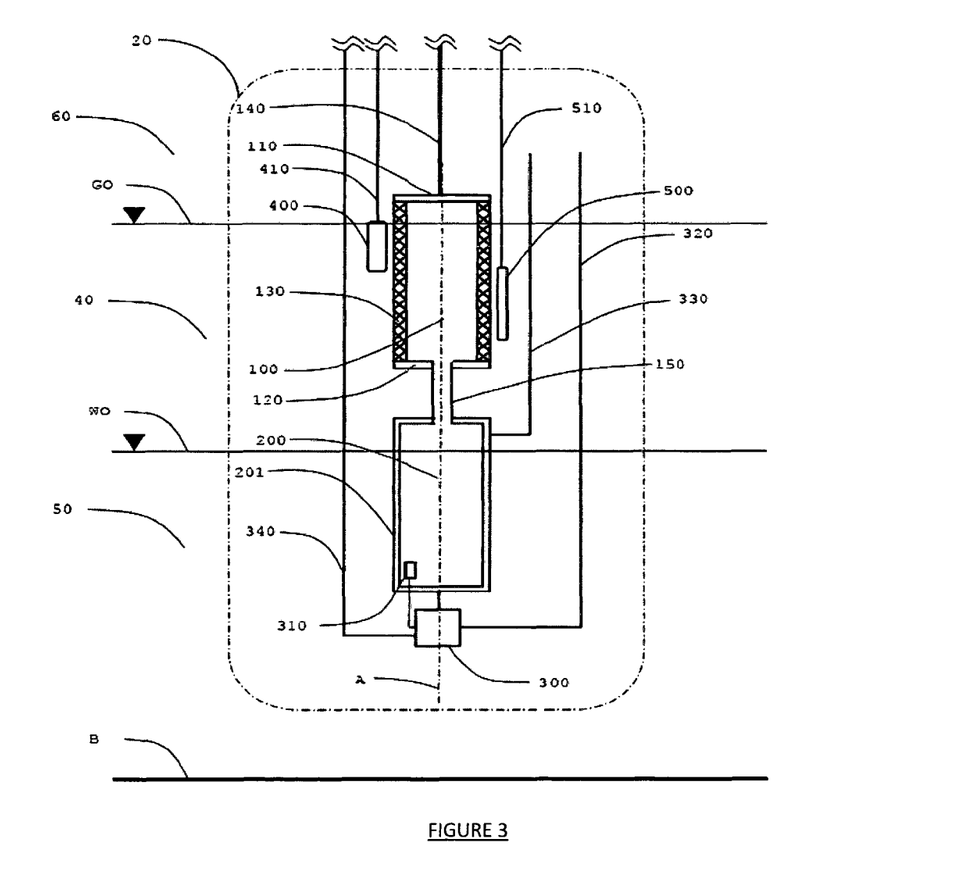
FIG. 3 is a simplified diagrammatic view of the mobile device of FIGS. 1 and 2A-2C with reference to its optimal positioning with respect to the demixed GO gas/phase interface.

Using the information from sensors 400, 500, 501 individually or in combination, it is possible not only to keep the mobile device around the optimum Lopt position but also to avoid excessive exposure of the hydrophobic filter to water under certain specific conditions by disengaging it from the body of water.

In the preferred configuration of the above-described invention, in which the equipment 10 comprises at least one level sensor 400, one phase sensor 500 and one phase sensor 501, the mobile device 20 is lowered into the body of contaminated water and the level sensor 400 adjusts its automatic positioning based on the measurements made and of the upper L2 and lower L1 values. Based on the information from the level 400 sensor, the mobile device 20 is automatically positioned so as to stay around the normal operating level Lopt. The phase sensor 500, when detecting the water phase, determines the disengagement of the mobile device 20 from the body of water; the phase sensor 501, when it detects demixed organic phase 40, determines the immersion of the mobile device 20 for re-starting the filtering operations.

Consequently, in a preferred configuration, the automatic process for removing a demixed organic phase 40 which extends from a lower interface surface WO with a heavier phase to an upper interface surface GO with a lighter phase in the body of the contaminated water also comprises the phases of:

o) lifting the mobile device 20 with a slow vertical velocity Vl until its complete disengagement from the liquid phase based on the information from the phase sensor 500, when the phase sensor 500 does not detect the demixed organic phase 40;

pp) keeping the mobile device (20) stationary in the fully disengaged position of the liquid phase when the second phase sensor 501 does not detect the presence of the demixed organic phase 40;

repeating phases d) to g) for a number of times.

The apparatus 10, for removing a demixed organic phase 40 in a contaminated water body, of the present invention as conceived is susceptible in every case to numerous modifications and variants, all of which fall within the same inventive concept; Moreover, all details can be replaced by technically equivalent elements. In practice, the materials used, as well as the shapes and the sizes, may be any according to the technical requirements.

The scope of protection of the invention is therefore defined by the appended claims.

The invention claimed is:

1. Apparatus for removing a demixed organic phase in a contaminated body of water, the demixed organic phase extending from a lower interface surface with a heavier phase to an upper interface surface with a lighter phase, the apparatus comprising:
a mobile device configured to be immersed in the contaminated body of water, the mobile device comprising:
a selectively permeable filter comprising a separation cavity,
a collection tank comprising a collecting cavity configured to contain hydrocarbons filtered by the selectively permeable filter wherein the separation cavity and the collecting cavity are fluidly coupled,
a suspension and handling control configured to automatically control a position of the mobile device with respect to the demixed organic phase,
at least one level sensor configured to determine a relative position of the mobile device with respect to the upper interface surface of the demixed organic phase;
a first phase sensor installed in a first predetermined position relative to the mobile device above an inlet of the collection tank and configured to detect a presence of the demixed organic phase;
a second phase sensor installed in a second predetermined position relative to the mobile device and below the first predetermined position of the first phase sensor, and
a surface device comprising:
a remote control and handling unit coupled to the at least one level sensor, the first phase sensor, and the second phase sensor such that the remote control and handling unit and the at least one level sensor, the first phase sensor, and the second phase sensor are configured to exchange information with one another, and
a motor configured to be controlled by the remote control and handling unit based on the information from the at least one level sensor, the first phase sensor, and the second phase sensor and coupled to the suspension and handling control.

2. Apparatus according to claim 1 wherein the selectively permeable filter is a hydrophobic filter.

3. Apparatus according to claim 1 further comprising a pump, wherein the pump is fluidly coupled to the collecting cavity and configured to empty the collection tank through an evacuation duct upon command of a pump level sensor installed inside the collection tank.

4. Apparatus according to claim 1, wherein the remote control and handling unit comprises at least one rechargeable battery coupled to the surface device, wherein the at least one rechargeable battery is configured to power the apparatus without the use of additional external power supply sources.

5. Apparatus according to claim 1 wherein at least one of the at least one level sensor, the first phase sensor or the second phase sensor is wirelessly coupled to the control and handling unit.

6. Apparatus according to claim 1, wherein the mobile device has a maximum cross-sectional dimension measured orthogonally to a longitudinal axis of the mobile device of less than 100 mm.

7. A process of use of the apparatus of claim 1 for automatically removing the demixed organic phase in the contaminated body of water, the demixed organic phase extending from the lower interface surface with the heavier phase to the upper interface surface with the lighter phase, the process comprising the steps of:
a) providing the apparatus;
d) lowering the mobile device into the contaminated body of water;
e) determining the position of the mobile device with respect to the upper interface surface of the demixed organic phase based on the information received from at least one of the at least one level sensor or the first or second phase sensor;
f) selectively filtering the demixed organic phase;
g) automatically changing the position of the mobile device based on the information received from at least one of the at least one level sensor or the first or second phase sensor by actuating the motor controlled by the remote control and handling unit; and
h) removing the mobile device from the contaminated body of water when the first phase sensor detects a water phase, and re-immersing the mobile device into the contaminated body of water when the second phase sensor detects the demixed organic phase in order to re-start filtering operations.

8. Process as claimed in claim 7 further comprising after step a) and before step d) the steps of:
b) defining a threshold value, a lower value, an upper value and a normal operating value, wherein the normal operating value is within a range of the lower value and the upper value, each of which is relative to a distance of the at least one level sensor from the upper interface surface of the demixed organic phase;
c) programming the remote control and handling unit by inputting the threshold value, the upper value, the lower value and the normal operating value;
wherein step g) is carried out when the distance of the at least one level sensor from the upper interface surface of the demixed organic phase is less than the upper value or is greater than the lower value, thereby maintaining the position of the mobile device at the normal operating value.

9. Process as claimed in claim 8 wherein step d) is performed with a vertical rapid handling speed of the mobile device between 50 mm/s and 300 mm/s, until the at least one level sensor does not measure the distance from the upper interface surface of the demixed organic phase equal to or higher than the threshold value.

10. Process as claimed in claim 8 wherein step h) is carried out with a vertical rapid handling speed of the mobile device between 50 mm/s and 300 mm/s, from when the at least one level sensor measures the distance from the upper interface surface of the demixed organic phase equal to or less than the threshold value.

11. Process as claimed in claim 8 wherein step g) is carried out with a vertical slow handling speed of the mobile device between 5 mm/s and 15 mm/s.

12. Process as claimed in claim 7 further comprising after step h) the steps of:
i) defining a standing time interval of the mobile device and inputting the standing time interval into a timer;

j) lowering the mobile device with a vertical rapid handling speed between 50 mm/s and 300 mm/s until the first phase sensor detects the demixed organic phase;
k) raising the mobile device with a vertical slow handling speed between 5 mm/s and 15 mm/s until the mobile device is disengaged from a liquid phase on the basis of the information received from the first phase sensor;
l) Lowering the mobile device with a vertical slow handling speed between 5 mm/s and 15 mm/s until the first phase sensor detects the demixed organic phase;
m) starting the timer until the standing time interval of the mobile device has elapsed;
n) once the standing time interval has elapsed, repeating steps k) to m) for a predetermined number of times.

13. Process as claimed in claim 12 further comprising after step n) the steps of:
o) raising the mobile device with a vertical slow handling speed between 5 mm/s and 15 mm/s until the mobile device is disengaged from the liquid phase on a basis of the information received from the first phase sensor, when the first phase sensor does not detect the demixed organic phase;
p) keeping the mobile device stationary and disengaged from the liquid phase for a predetermined pause time;
q) repeating steps j) to p) for a predetermined number of times.

14. Process as claimed in claim 12, further comprising after step n) the steps of:
p) raising the mobile device with a vertical slow handling speed between 5 mm/s and 15 mm/s until the mobile device is disengaged from the liquid phase, when the first phase sensor does not detect the demixed organic phase;
pp) keeping the mobile device stationary and disengaged from the liquid phase when the second phase sensor does not detect the presence of the demixed organic phase;
q) repeating steps j) to p) for a predetermined number of times.

15. Process as claimed in claim 8 further comprising after step h) the steps of:
p) raising the mobile device with a vertical slow handling speed between 5 mm/s and 15 mm/s until the mobile device is disengaged from a liquid phase on a basis of the information received from the first phase sensor, when the first phase sensor does not detect the demixed organic phase;
pp) keeping the mobile device stationary and disengaged from the liquid phase when the second phase sensor does not detect the demixed organic phase;
r) repeating steps d) to g) for a predetermined number of times.

* * * * *